Patented Aug. 22, 1939

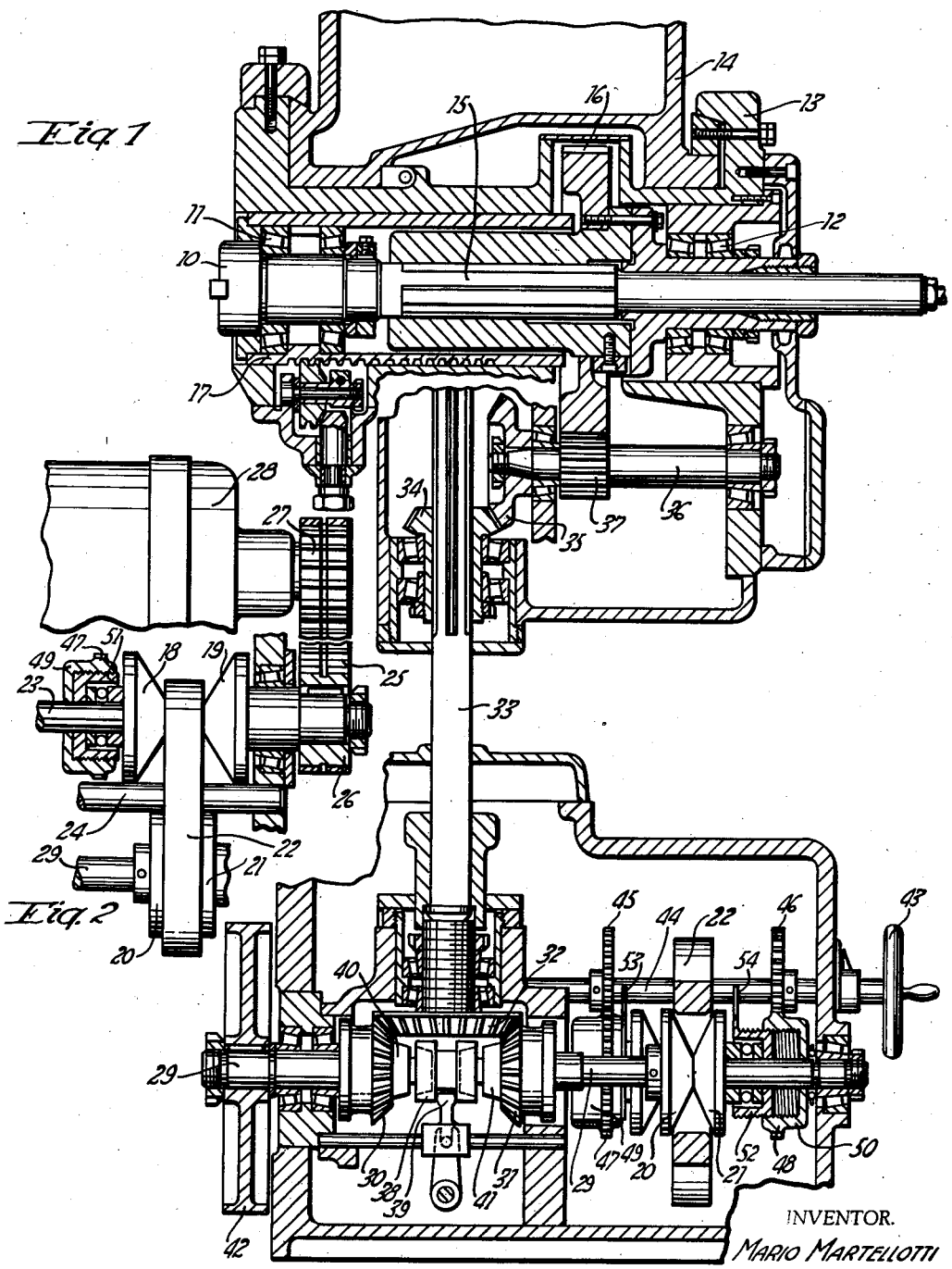

2,170,502

UNITED STATES PATENT OFFICE 2,170,502

MACHINE TOOL TRANSMISSION

Mario Martellotti, Cincinnati, Ohio, assignor to The Cincinnati Milling Machine Co., Cincinnati, Ohio, a corporation of Ohio Application March 26, 1936, Serial No. 70,988

5 Claims. (Cl. 74—191)

This invention relates to machine tools and more particularly to an improved variable speed transmission therefor.

One of the objects of this invention is to make possible the use of a variable speed friction device in machine tool drives having large power variations for any given speed.

Another object of this invention is to provide a transmission having a variable speed friction device for obtaining rate changes, which is applicable to machine tool drives having a large power variation for any given speed, without causing excessive wear on the device.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

Figure 1 is a sectional view in elevation of a transmission embodying the principles of this invention.

Figure 2 is a fragmentary view showing the variable speed friction device in plan, and the means for coupling it to a prime mover.

It is recognized that variable speed friction devices have been used to a limited extent in machine tools and other forms of machinery, but usually the applications have been confined to instances wherein power demand is substantially uniform. Because of the inherent nature of a friction drive of any type they are regarded as unsuitable where the power demand varies intermittently over a wide range for any given speed.

In the conventional belt drive, for instance, the portion of the belt that lies to one side of the pulleys and which transmits the driving force is known as the tight side of the belt, and the remaining portion on the other side of the pulley is known as the slack side of the belt. When the load increases without change of speed, the tight side is put under greater tension and the belt grips the pulleys more tightly. Thus, a sort of readjustment occurs.

If the power requirement intermittently increases and decreases in rapid succession, it will be apparent that oscillations will be set up in the belt due to variations in tension in the tight side of the belt. This phenomena will occur regardless of whether the power transmitting band is a deformable or non-deformable type.

This invention contemplates the use of a variable speed friction device utilizng a power transmitting band of the non-deformable type, such as a metallic ring. In such a device, for every variation of load, the ring automatically changes its position in such a manner as to increase the pressure of contact between the ring and the driving and driven cones. If such a device were utilized in drives having continuous power variation, there would be set up a tangential oscillation of the ring accompanied by sudden increase and decrease of the contactual pressure, which would cause excessive wear and very shortly render the device useless for practical purposes.

In this invention there has been contrived a transmission in which the various elements are arranged in a predetermined succession or order, whereby the life of the variable speed friction device is materially lengthened.

One instance of a driven member which will cause the power requirement to vary for a given speed thereof is the cutter spindle of a milling machine, and especially when utilized to rotate a slotting cutter which has straight teeth uniformly spaced around its periphery. These teeth intermittently engage the work and cause a rapid rise and fall in the power requirement. Such a tool spindle is indicated by the reference numeral 10 in Figure 1 of the drawing and this spindle is supported by anti-friction bearings 11 and 12 which may be mounted in a carrier 13 which is adjustable relative to a fixed support 14. The spindle may have a splined connection as at 15 to a bull gear 16 which drives the same but is held against axial movement by the thrust bearing 12. This permits the forward portion of the spindle to be attached to a quill 17, whereby the cutter spindle may be axially adjusted without breaking its driving connection.

For the purpose of varying the rate of rotation of the spindle, a variable speed friction device is utilized which may be the same as that shown in U. S. Patent 1,950,675, filed October 15, 1931, and issued March 13, 1934, to D. H. Heynau. This device comprises mainly a first pair of tapered friction discs 18 and 19, as shown in Figure 2, and a second pair of tapered friction discs 20 and 21, as shown in Figure 1, and a metallic ring 22 passes around these discs and is always in driving contact therewith. Variations in rate are obtained by simultaneously adjusting the disc 18 toward the disc 19 and the disc 21 away from the disc 20 or vice versa.

This adjustment is accomplished by a hand wheel 43 attached to shaft 44 which is operatively connected by gears 45 and 46 to gears 47 and 48 formed integrally with the female threaded members 49 and 50. Members 51 and 52 are threaded into the members 49 and 50, but held against rotation by forks 53 and 54 which engage the shaft 44. By holding one member against rotation relative to the other it will be apparent that longitudinal movement between them may be effected by relative rotation between them, and thus longitudinal movement of the tapered cone associated therewith.

Since all of these parts are of metal, it is apparent that if vibration is set up in the ring 22 that the parts would be literally pounded to pieces in a short time. To obviate these deleterious effects, this device has been connected in a definite serial relation to the remaining parts of the transmission and means are provided whereby the vibrations caused by the intermittent action of the cutter are absorbed before they reach the variable speed device. To this end, the drive shaft 23 of the variable speed friction device, indicated generally by the reference numeral 24, is connected by suitable power transmitting means, such as the chain 25 and sprocket wheels 26 and 27, to a prime mover 28. When the prime mover is running, it continuously actuates the variable speed device and its output shaft 29. The shaft 29 supports for free rotation a pair of bevel gears 30 and 31 which intermesh with a common bevel gear 32 secured to the end of shaft 33. This shaft drives bevel gear 34, which intermeshes with gear 35 secured to the shaft 36. This shaft has a pinion 37 secured thereto which drives the bull gear 16.

A double cone friction clutch 38 splined on the shaft 29 is adapted to be shifted by the fork 39 to selectively engage the friction cone 40 integral with bevel gear 30, or the friction cone 41 integral with the bevel gear 31 for driving the shaft 33, and thereby the spindle in opposite directions. This clutch may also be moved to a central position, as shown in Figure 1, for stopping rotation of the cutter spindle.

In order to prevent vibrations of the cutter spindle from being transmitted to the variable speed friction device, a flywheel 42 is attached to the end of shaft 29, and this flywheel should be made sufficiently large and have sufficient mass to produce the necessary inertia effects to equalize the load on the output shaft of the friction device and thus minimize oscillations of the ring to a practical degree. In order to obtain the desired results it is to be noted that the prime mover is connected in a substantially one to one ratio with the variable friction device whereby the output shaft 29 will have a relatively high speed, and that the flywheel is attached to this output shaft whereby the flywheel will also have a relatively high rate of rotation and thereby be more effective in accomplishing the purposes for which it is intended. From this point on to the spindle, the gearing is so arranged that there is a series of reductions effected so that the final rates of rotation of the cutter spindle 10 are not any greater than those conventionally employed in present day machines. In other words, there is a first reduction effected between bevel gears 30, 31 and the driven gear 32; between the driving bevel gear 34 and the driven bevel gear 35; and between the driving pinion 37 and the bull gear 16.

It will thus be seen that an improved variable speed transmission has been provided for a machine tool element which inherently creates a variable power demand, comprising a variable speed friction device which is directly coupled to a prime mover for a relatively high rate of rotation, and that the output shaft of the device has directly connected thereto a flywheel, whereby the best inertia effects can be obtained and that this output shaft is connected through a reduction train to the spindle in order that conventional speed rates thereof may be obtained in spite of the fact that the first portion of the transmission is driven at a higher rate than is usual in such cases.

What is claimed is:

1. In a spindle transmission for a milling machine, the combination of a prime mover, a variable speed friction device comprising a first pair of co-axial metallic conical discs, motion transmitting means coupling said discs to the prime mover for actuation thereby, a second pair of co-axial metallic conical discs, a metallic friction ring circumscribing said discs and in frictonal engagement therewith for transmitting motion from the driving discs to the driven discs, a shaft supporting said driven discs, a milling machine spindle adapted to actuate a cutter having a natural period of vibration during cutting, reduction gearing connecting said shaft for rotation of the spindle whereby said shaft will always rotate at a greater rate than said spindle, and means attached to said shaft for preventing tangential oscillation of said metallic ring relative to said driven discs and thereby prevent deformation of the conical surfaces of said driven discs.

2. In a spindle transmission for a milling machine, the combination with a cutter spindle adapted to drive a cutter having a natural period of vibration, of a prime mover, a first shaft having a pair of co-axial metallic conical discs fixed therewith, a power transmitting band coupling the shaft to the prime mover, a second shaft having a driven pair of co-axial metallic conical discs supported thereon, a metallic friction ring circumscribing said discs and in frictional engagement therewith, means to adjust one pair of said discs axially away from one another and the other pair of discs axially toward one another to vary the rate of rotation of said driven discs, reduction gearing connecting the final shaft to said spindle whereby said shaft will rotate at a greater rate than said spindle, and means associated with said final shaft to prevent oscillation of said spindle from causing tangential oscillation of said ring relative to the driven pair of said discs and thereby prevent mutilation of the conical surfaces of said driven discs.

3. In a milling machine transmission, the combination of a prime mover, a cutter spindle adapted to drive cutters having an inherent period of oscillation, a first drive shaft having a pair of conical discs supported thereon, means connecting said shaft to the prime mover for actuation thereby, a final shaft, a pair of conical discs supported on said final shaft, a rigid metallic ring circumscribing said discs, means to effect relative adjustment between the pairs of discs to vary the speed of rotation of said final shaft, a reduction gear train extending to said spindle, a reversing mechanism coupling said final shaft to said gear train, and means attached to said final shaft for preventing vibration of the spindle from causing tangential oscillation of the metallic ring relative to the discs carried by said final shaft.

4. In a transmission for driving a toothed cutter actuating spindle of a milling machine through a rate changer of the stepless variety, comprising pairs of conical discs and a rigid connecting member, the combination with a prime mover of means for connecting the rate changer in serial power transmitting relationship between the prime mover and the spindle in a manner to prevent inherent vibration of the toothed cutter from injuring the contactual faces of the conical discs, comprising means coupling the prime mover to the first pair of said discs for actuation at a relatively fast rate, a shaft having the second pair of said discs rigidly connected thereto, speed reduction gearing connecting the shaft for actuation of the spindle whereby the spindle will always rotate at a slower rate than said shaft, and means attached to said shaft to prevent spindle vibration created by said toothed cutter from causing said rigid member to rapidly and intermittently grip the surfaces of said driven cones and causing mutilation of the contactual surfaces thereof.

5. In a transmission for driving a toothed cutter actuating spindle of a milling machine through a stepless rate changer of the variety consisting of spaced pairs of conical discs and a rigid friction connecting member, the combination with a prime mover, of means connecting the rate changer in serial power transmitting relationship with the prime mover and spindle in a manner to prevent the inherent vibration created by the toothed cutter from injuring the contactual faces of the driven pair of discs, comprising motion transmitting means coupling the prime mover to the first set of discs for actuation thereof at a relatively fast rate, a supporting shaft for the driven pair of discs, means to inversely change the spacing between the respective pairs of discs to effect stepless changes in the rate of rotation of the spindle, speed reduction gearing connecting said shaft to the spindle, including a reversing mechanism, and means attached to said shaft to prevent spindle vibration created by said toothed cutter from causing rapid vibration of the driven discs relative to the rigid driving member regardless of the direction of rotation of said spindle, whereby rapid deformation of the surfaces of the driven pair of conical discs will be prevented.

MARIO MARTELLOTTI.